(12) United States Patent
Sahita et al.

(10) Patent No.: US 8,468,356 B2
(45) Date of Patent: Jun. 18, 2013

(54) SOFTWARE COPY PROTECTION VIA PROTECTED EXECUTION OF APPLICATIONS

(75) Inventors: Ravi L. Sahita, Beaverton, OR (US); Uday R. Savagaonkar, Beaverton, OR (US); Vedvyas Shanbhogue, Portland, OR (US); Ernest F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1201 days.

(21) Appl. No.: 12/165,260

(22) Filed: Jun. 30, 2008

(65) Prior Publication Data

US 2009/0323941 A1 Dec. 31, 2009

(51) Int. Cl.
*G06F 21/00* (2006.01)

(52) U.S. Cl.
USPC .......................................................... 713/176

(58) Field of Classification Search
USPC ........................... 713/150, 155, 156, 168, 176
See application file for complete search history.

(56) References Cited

U.S. PATENT DOCUMENTS

| | | | |
|---|---|---|---|
| 5,826,041 A | 10/1998 | Ogus | |
| 6,708,272 B1 | 3/2004 | McCown et al. | |
| 7,444,523 B2 | 10/2008 | Morais et al. | |
| 7,627,758 B1 | 12/2009 | Tock et al. | |
| 8,127,292 B1 * | 2/2012 | Dobrovolskiy et al. | 718/1 |
| 8,171,321 B2 | 5/2012 | Kumar et al. | |
| 8,244,945 B2 | 8/2012 | Shanbhogue et al. | |
| 2002/0082824 A1 | 6/2002 | Neiger et al. | |
| 2002/0108050 A1 | 8/2002 | Raley et al. | |
| 2002/0161891 A1 | 10/2002 | Higuchi et al. | |
| 2002/0166070 A1 | 11/2002 | Mualem et al. | |
| 2003/0149670 A1 * | 8/2003 | Cronce | 705/59 |
| 2004/0062267 A1 | 4/2004 | Minami et al. | |
| 2004/0153672 A1 | 8/2004 | Watt et al. | |
| 2005/0039183 A1 | 2/2005 | Romero et al. | |
| 2005/0132122 A1 | 6/2005 | Rozas | |
| 2005/0182838 A1 | 8/2005 | Sheets et al. | |
| 2005/0204405 A1 * | 9/2005 | Wormington et al. | 726/27 |
| 2005/0209876 A1 | 9/2005 | Kennis et al. | |
| 2005/0223220 A1 | 10/2005 | Campbell et al. | |
| 2005/0246716 A1 | 11/2005 | Smith et al. | |
| 2005/0259678 A1 | 11/2005 | Gaur | |

(Continued)

FOREIGN PATENT DOCUMENTS

| | | |
|---|---|---|
| CN | 101944013 A | 1/2011 |
| EP | 0179401 A2 | 4/1986 |

(Continued)

OTHER PUBLICATIONS

"Intel Trusted Execution Technology Architectural Overview", 2003, Intel Corporation, http://www.intel.com/technology/security/downloads/arch-overview.pdf, retrieved from wayback machine.*

(Continued)

*Primary Examiner* — Kambiz Zand
*Assistant Examiner* — John B King
(74) *Attorney, Agent, or Firm* — Caven & Aghevli LLC

(57) ABSTRACT

Methods and apparatus to provide a tamper-resistant environment for software are described. In some embodiments, procedures for verifying whether a software container is utilizing protected memory and is associated with a specific platform are described. Other embodiments are also described.

20 Claims, 6 Drawing Sheets

U.S. PATENT DOCUMENTS

| | | | |
|---|---|---|---|
| 2005/0278722 | A1 | 12/2005 | Armstrong et al. |
| 2006/0048221 | A1 | 3/2006 | Morais et al. |
| 2006/0080257 | A1* | 4/2006 | Vaughan et al. ............ 705/51 |
| 2006/0080553 | A1 | 4/2006 | Hall |
| 2006/0143687 | A1 | 6/2006 | O'Connor et al. |
| 2006/0174077 | A1 | 8/2006 | Abadi et al. |
| 2006/0184549 | A1 | 8/2006 | Rowney et al. |
| 2006/0190243 | A1 | 8/2006 | Barkai et al. |
| 2006/0206887 | A1 | 9/2006 | Dodge et al. |
| 2006/0236094 | A1 | 10/2006 | Leung et al. |
| 2006/0272027 | A1 | 11/2006 | Noble |
| 2007/0006175 | A1 | 1/2007 | Durham et al. |
| 2007/0028244 | A1 | 2/2007 | Landis et al. |
| 2007/0033419 | A1* | 2/2007 | Kocher et al. ............ 713/193 |
| 2007/0100771 | A1* | 5/2007 | Eckleder et al. ............ 705/67 |
| 2007/0192761 | A1 | 8/2007 | Sahita et al. |
| 2007/0192854 | A1 | 8/2007 | Kelley et al. |
| 2007/0234061 | A1* | 10/2007 | Teo ............ 713/178 |
| 2007/0266037 | A1 | 11/2007 | Terry et al. |
| 2008/0022129 | A1 | 1/2008 | Durham et al. |
| 2008/0059811 | A1 | 3/2008 | Sahita et al. |
| 2008/0114916 | A1 | 5/2008 | Hummel et al. |
| 2008/0235793 | A1 | 9/2008 | Schunter et al. |
| 2008/0244573 | A1 | 10/2008 | Sahita et al. |
| 2009/0019437 | A1* | 1/2009 | Feng et al. ............ 718/1 |
| 2009/0038017 | A1 | 2/2009 | Durham et al. |
| 2009/0083532 | A1* | 3/2009 | Brannock et al. ............ 713/1 |
| 2009/0172328 | A1 | 7/2009 | Sahita et al. |
| 2009/0172346 | A1 | 7/2009 | Sahita et al. |
| 2009/0172438 | A1 | 7/2009 | Kumar et al. |
| 2009/0172639 | A1* | 7/2009 | Natu et al. ............ 717/120 |
| 2009/0222792 | A1 | 9/2009 | Shanbhogue et al. |
| 2009/0241189 | A1 | 9/2009 | Shanbhogue et al. |
| 2009/0327575 | A1 | 12/2009 | Durham et al. |
| 2010/0169667 | A1 | 7/2010 | Dewan |
| 2010/0169968 | A1 | 7/2010 | Shanbhogue et al. |
| 2010/0333206 | A1 | 12/2010 | Dewan et al. |

FOREIGN PATENT DOCUMENTS

| | | |
|---|---|---|
| JP | 2006-065851 A | 3/2006 |
| JP | 2007-510198 A | 4/2007 |
| TW | 201032137 A1 | 9/2010 |
| WO | 2005/036405 A1 | 4/2005 |
| WO | 2007/027739 A1 | 3/2007 |
| WO | 2009/069136 A2 | 6/2009 |
| WO | 2010/078143 A2 | 7/2010 |
| WO | 2010/078143 A3 | 8/2010 |

OTHER PUBLICATIONS

Tan, Min "Home PC Maintenance with Intel AMT", Intel Technology Journal, vol. 11, Issue 1, 12, (Feb. 15, 2007), pp. 57-66.

Shanbhogue et al., "Virtualization Enabled Integrity Services (VIS)", Nov. 2007, 10 pages.

Office Action Received for U.S. Appl. No. 12/347,890, mailed on Jun. 27, 2012, 25 pages.

Grevstad, Eric, "CPU-Based Security: The NX Bit Jupiterimages", May 24, 2004, 4 pages.

Office Action Received for U.S. Appl. No. 12/039,486, mailed on Aug. 3, 2012, 13 pages.

Office Action received for U.S Appl. No. 11/516,113, mailed on Nov. 6. 2009, 17 pages.

International Search Report and Written Opinion received for Patent Application No. PCT/US2009/069136, mailed on Jun. 29, 2010, 10 pages.

International Preliminary Report on Patentability Received for the PCT Application No. PCT/US2009/069136, mailed on Jul. 14, 2012, 5 pages.

Office Action Received for U.S. Appl. No. 11/516,113, mailed on May 21, 2010, 14 pages.

Office Action Received for U.S. Appl. No. 12/459,359, mailed on Aug. 30, 2011, 23 pages.

Office Action Received for U.S. Appl. No. 12/459,359, mailed on Jan. 6, 2012, 23 pages.

Office Action Received for U.S. Appl. No. 11/395,488, mailed on Apr. 15, 2008, 20 pages.

Office Action Received for U.S. Appl. No. 11/395,488, mailed on Apr. 27, 2009, 20 pages.

Uhlig, Rich et al., "Intel Virtualization Technology", IEEE Computer Society, May 2005, pp. 48-56.

Notice of Allowance Received for the U.S. Appl. No. 12/050,862, mailed on Apr. 16, 2012, 5 pages.

Office Action Received for U.S. Appl. No. 12/050,362, mailed on Mar. 18, 2011, 10 pages.

Office Action Received for U.S. Appl. No. 12/050,862, mailed on Oct. 19, 2011, 10 pages.

Dewan, et al., "A Hypervisor-based system for protecting software runtime memory and persistent storage", Apr. 2008.

Sahita, et al. "Mitigating the Lying-Endpoint Problem in Virtualized Network Access Framework", Oct. 2007.

"Key Blobs: Windows CE .Net", from MSDN, Retrieved on Jan. 1, 2013 Webpage Available at: <http://msdn.microsoft.com/en-us/library/ms884374.aspx>, last updated Apr. 8, 2004, with copyright notice 1992-2003.

Office Action Received for U.S. Appl. No. 12/347,890, mailed on Nov. 5, 2012, 24 pages.

Office Action received for Japanese Patent Application No. 2011-536632, mailed on Jan. 15, 2013, 4 Pages of Office Action and 4 pages of English Translation.

* cited by examiner

SOFTWARE COPY PROTECTION VIA PROTECTED EXECUTION OF APPLICATIONS

FIELD

The present disclosure generally relates to the field of computing. More particularly, an embodiment of the invention generally relates to software copy protection via protected execution of applications.

BACKGROUND

As computer networks become more common place and faster, various types of services may become available to computing platforms through such networks. One example of such services is a Software-As-A-Service (SAAS).

In SAAS or digital content delivery model, software and/or content may be delivered on demand over a network to a computing platform. In the SAAS model, software metering may be used to measure the use of software on a platform based on vendor metrics. For example, software metering may be done by ensuring that credits allocated for software are correctly counted (e.g., when accessed) to determine if the software may continue executing on the platform. However, there may be various security attacks possible on the software portion of these models which may effectively disable the software metering functionality or allow for snooping on decrypted content, thereby directly attacking the revenue model for providers relying on such delivery models.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

In some implementations, software metering may utilize hardware support to ensure that the platform resources used for executing metered software are tracked for their use by time or units of compute used. For example, there may be some basic aspects of metering that may be implemented in hardware, such as, time stamping events when certain software was installed, tamper-resistant storage, or out-of-band network connections, e.g. via Intel's® Active Management Technology (AMT). There is also a larger aspect of software metering that may be an instrumentation of application to collect application-specific meta-data that may account for how the application is being used. Applications may also interact with operating system (OS) specific services that may use this meta-data to make decisions on resources given to the metered applications. However, as previously discussed, there may be various security attacks possible on the software portion of these models which may effectively disable the software metering functionality or allow for snooping on decrypted content, thereby directly attacking the revenue model for providers relying on such delivery models.

To alleviate these issues, some of the embodiments discussed herein may provide techniques for associating a software application with a computing platform and verifying whether the software application is utilizing protected memory of the computing platform. For example, in one embodiment, a remote server may verify whether a software container is utilizing protected memory on a specific machine based on a platform specific value and a negotiated value shared between the server and the software container.

Figure 1:
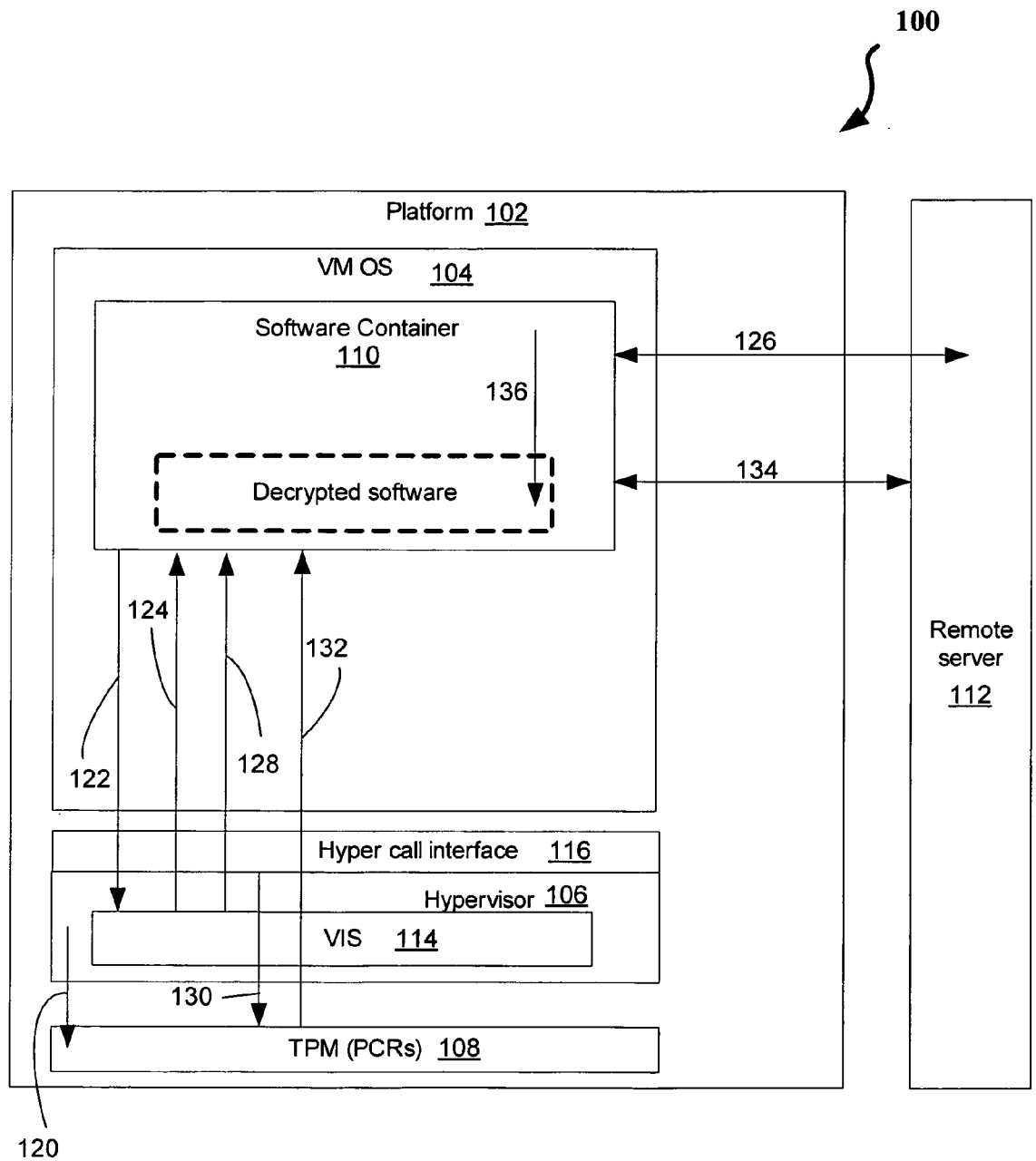
FIGS. 1 and 2 illustrate embodiments of systems in accordance with some embodiments of the invention.

FIG. 1 illustrates an embodiment of the components of a system 100 for protecting the execution of a software application, according to an embodiment. The system 100 includes a computing platform 102 which may include an operating system 104 (e.g., running in a hardware virtual machine), a virtual machine monitor 106 (also referred to herein as a "hypervisor"), and a trusted platform module (TPM) (e.g., including platform configuration registers (PCRs)) 108. The various components of the system 100 may interact with the hypervisor 106 through the hyper call interface 116.

Furthermore, the operating system 104 may include a software container (which may also be referred to as "software module") 110. For example, in the case of a SAAS implementation, the software container 110 may be a portable executable (PE) packer or the minimal portion of an application. In one embodiment, once a remote server 112 verifies that the software container 110 is executing under Intel's® Virtualization Technology (VT) Integrity Services (VIS) memory protection (e.g., via exchange of one or more signals or messages), the remote server 112 may provide the requisite information to the PE-packer so that it may unpack the encrypted PE file in protected memory of the platform 102 for execution. Additionally, software may be streamed in an encrypted manner (e.g., via a secure communication channel, including for example, using IPSec (Internet Protocol security) or TLS (Transport Layer Security)) to the software container 110 where it may be decrypted under memory protection. Additionally, in some embodiments, e.g., in the case of a content protection implementation, the software container 110 may be a content player which may retrieve keys for the specific digital rights management (DRM) scheme it follows, such as the advanced access content system (AACS).

In some embodiments, encryption keys may be delivered to the computing platform 102 such that they may be accessible only by the software container 110 with which the server 112 communicates. For example, this may be achieved by the software container 110 passing keys to the hypervisor via protected memory. The hypervisor may perform a TPM_Seal operation to seal the AACS keys along with platform configuration register (PCR) state into the platform trusted platform module (TPM) 108. Subsequent launches of the software may allow the hypervisor 106 to deposit keys into protected memory.

As shown in FIG. 1, the system 100 may also include a remote server 112 that may be responsible for verifying the software container 110 is utilizing protected memory of the platform 102 and is running on the same platform as the hypervisor 106, as will be discussed further herein with reference to FIGS. 3 and 4.

Additionally, FIG. 1 illustrates the interactions that some of the components of the system 100 may have relative to each other, as will be discussed further herein with reference to FIGS. 3 and 4. At 120, upon launching the hypervisor, a measurement of the hypervisor 106 may be written to one of the platform configuration registers 108. At 122, the software container 110 may send a registration message to the hypervisor 106. Additionally, at 124 the hypervisor may verify the contents of the software container 110 and protect the memory pages for the software container 110. For example, the hypervisor 106 may use VIS 114 to protect the pages for the software container 110 in memory. At 126, the software container 110 may participate in Diffie-Hellman (DH) based negotiation with the remote server 112 to generate a shared secret key or value which may be used to perform verification operations, e.g., as will be discussed further herein with reference to FIGS. 3 and 4.

Furthermore, at 128, the hypervisor 106 may retrieve the shared value from the software container 110. At 130, the hypervisor may sign (e.g., encrypt) the hypervisor measurement stored in the platform configuration registers 108 and the shared value from the software container. 110. Additionally, at 132, the encrypted values may be returned to the software container 110. At 134, the encrypted values may be communicated to the remote server 112 and may be used to verify whether the software container 110 is utilizing protected memory on the platform 102 and whether the software container 110 is running on the same platform as the hypervisor 106. Once the verification by the remote server 112 is done, the software container 110 may decrypt and/or decompress a portion of itself into the protected memory at 136.

Figure 2:
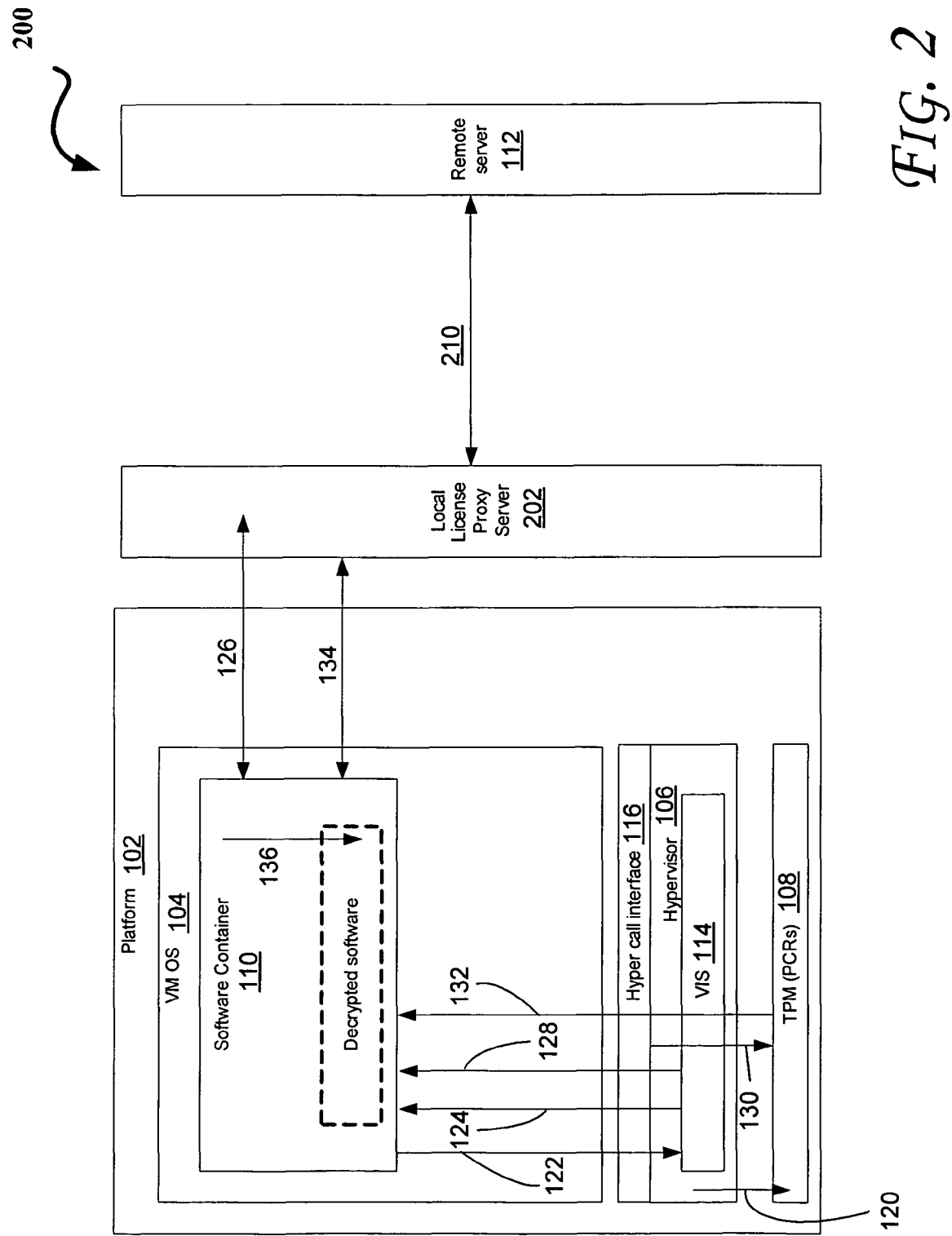

FIG. 2 illustrates an embodiment of the components of a system 200 for protecting execution of a software application, according to an embodiment. In addition to the components discussed with reference to FIG. 1 above, the system 200 may include a local trusted entity 202. For example, the local trusted entity 202 may be a local license proxy server executing in a partition (e.g., a service partition) or on a dedicated controller such as the Intel® Management Engine (ME). The local license proxy server 202 may negotiate with the remote server 112 for a license and the remote server 112 may issue a license to the local license proxy server 202. For example, the negotiation and provisioning of the license to the remote server proxy may be carried out over a trusted channel established either in-band or out-of-band (e.g., through Intel's Active Management Technology (AMT) in an embodiment). Once the license is issued, the local license proxy server may then allow the contents of the software container 110 to be executed in accordance with the negotiated license and based on the verification operations as discussed with reference to 126 and 134 of FIG. 1.

Moreover, the local license proxy server 202 may perform the operations performed by the remote server 112 of system 100, as described with reference to operations 126 and 134 of system 100. For example, on mobile systems, such configuration may allow for an "occasionally" connected mode of operation where the software application may not have network connectivity to interact with a remote server continuously. To handle such scenarios, the remote server 112 may delegate the DH negotiation and verification of the TPM quote to a local trusted entity like its local license proxy server 202 (e.g., executing in a service partition or on a dedicated controller such as the Intel Management Engine (ME)). The remote server 112 may provide this proxy with authorization to allow the protected software to be used as per a negotiated license, e.g., number of invocations, time based, etc.

Figure 3:
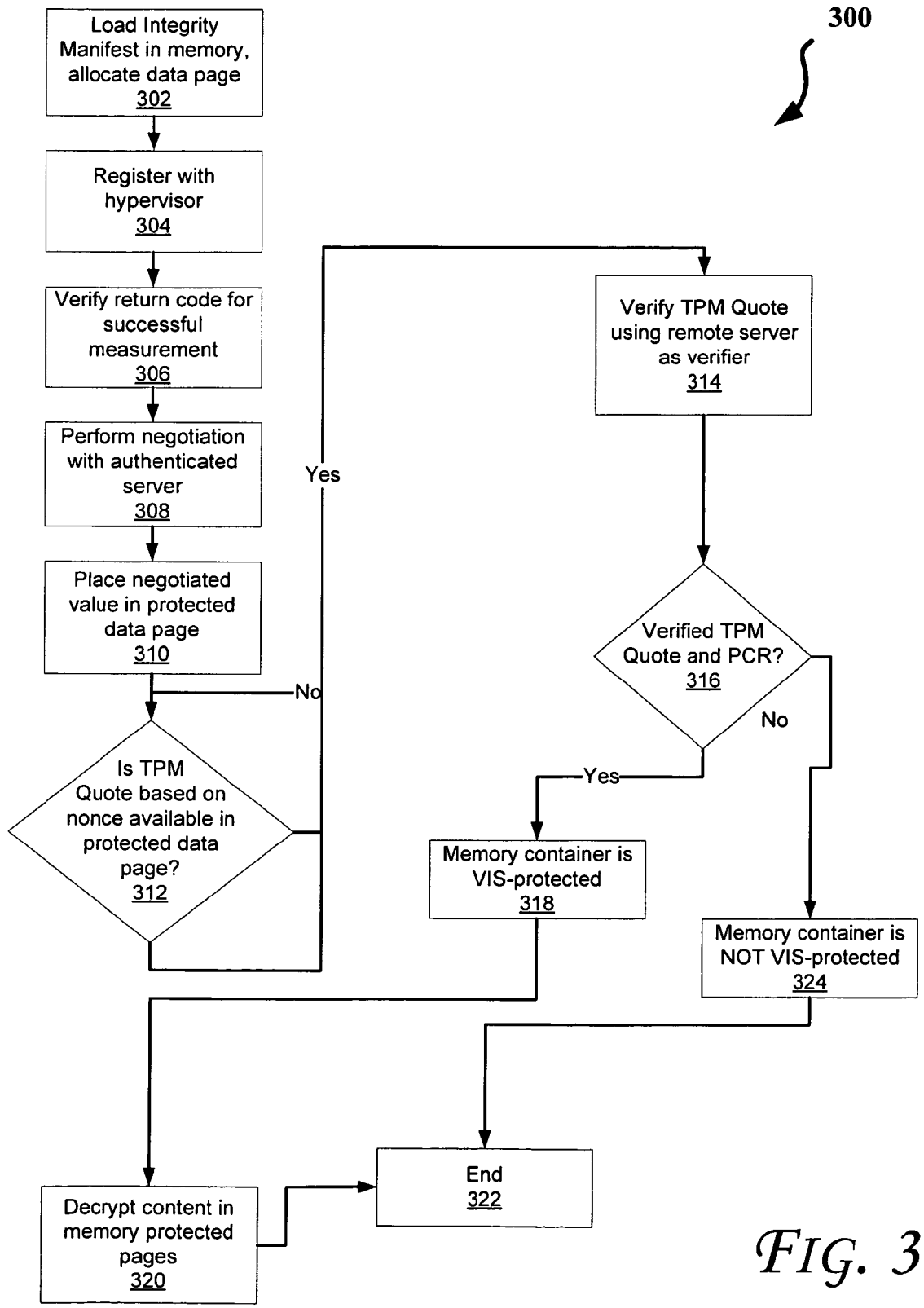
FIGS. 3 and 4 illustrate flow diagrams of methods, according to some embodiments of the invention.

FIG. 3 illustrates a flow diagram of a method 300 to verify whether a software container is utilizing protected memory pages and/or whether it is running on a particular platform, according to some embodiments. In particular, method 300 describes operations that may be performed by a software container (such as the software container 110 of FIGS. 1 and 2) to achieve verification. In some embodiments, the operations of method 300 may be performed in cooperation with the operations of method 400 of FIG. 4.

Referring to FIGS. 1-3, at an operation 302, a software container (e.g., software container 110) may load an integrity manifest into memory and allocate a data page for storing data which may be protected by a hypervisor (such as the hypervisor 106), e.g., as will be described further herein below with reference to FIG. 4. For example, the software container may be instrumented offline to contain an integrity manifest. At an operation 304, the software container may register with the hypervisor via a hyper call interface (e.g., hyper call interface 116) or another Application Programming Interface (API). For example, on launch of the software container, the integrity manifest may be sent to the hypervisor in a registration message. Additionally, at an operation 306, the software container may verify a return code from the hypervisor indicating that the hypervisor successfully measured and verified the contents of the software container based on the integrity manifest, as will be discussed further herein with reference to FIG. 4 below. At an operation 308, the software container may perform a negotiation (e.g., in accordance with DH) with an authenticated remote server (e.g., server 112) to generate a shared secret value. At an operation 310, the software container may place the negotiated value in the protected data page allocated to the software container. For example, the container may execute a DH exchange with the authenticated remote server to generate a shared secret located at a predetermined location in the data page cleared and protected by the hypervisor, e.g., as will be discussed referring to FIG. 4 below.

At an operation 312, the software container checks the protected data page to determine if the hypervisor has written a Trusted Platform Module (TPM) Quote based on a nonce (which generally refers to a number or bit string used only once in security) including for example the DH shared secret value (also referred to herein more generally as "nonce") to the protected data page. For example, a TPM Quote command may be used to sign selected PCRs (in one example, PCR 17 set as a result of the hypervisor launch) and the provided shared secret with the TPM automatic installation kit (AIK) private key.

At an operation 314, the software container may verify the TPM Quote by using the remote server as verifier. For example, the software container may provide the quote to the remote server that verifies that the certificate is valid and then may use the AIK public key to verify whether the TPM Quote is valid. The contents of the TPM Quote may be used to verify whether the hypervisor is running and that the DH exchange was done in VIS-protected memory on the same platform that the hypervisor is executing on. This process may protect the software container against man-in-the-middle attacks where rogue software may execute the hypervisor on one platform and the software container on the other.

At an operation 316, the remote server may verify the TPM Quote and the PCR value. At an operation 318, it may be determined that the software container is utilizing VIS-protected memory. Alternatively, at an operation 324, it may be determined that the software container is not using VIS-protected memory at which point the processing of the software container may be finished, operation 322. At an operation 320, the software container may decrypt content in protected memory pages based on the determination made at operation 318. For example, the software container may unpack compressed PE files or decrypt content using VIS-protected memory.

Figure 4:
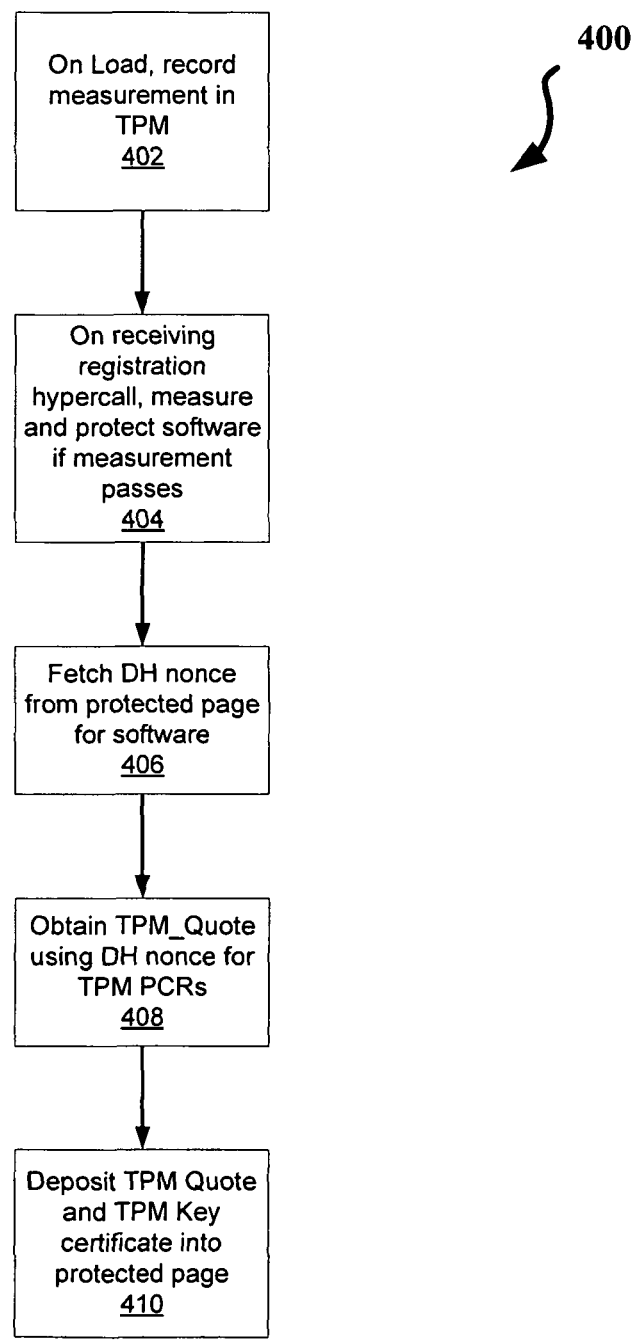

FIG. 4 illustrates a flow diagram of a method 400 to verify whether a software container is utilizing protected memory pages and/or is running on a particular platform, according to some embodiments. In particular, method 400 describes the operations that may be done by a hypervisor (such as the hypervisor 106 of FIGS. 1 and 2) to perform verification. In some embodiments, the operations of method 400 may be performed in conjunction with the operations of method 300 to achieve verification. At an operation 402, the hypervisor may record a measurement of the hypervisor in a TPM PCR (e.g., by issuing a Trusted Execution Technology (TXT) SENTER command). For example, the hypervisor (or Virtual Machine Monitor (VMM)) may use TXT during launch thereby ensuring that TPM PCR 17 contains the measurement of the hypervisor. Additionally, the hypervisor may use VT to launch an OS in a hardware virtual machine (HVM).

At an operation 404, the hypervisor may measure and protect the software container if the measurement of the software container is verified. For example, the hypervisor may receive a registration message from the software container containing an integrity manifest. The registration message may be un-trusted and may be used by the hypervisor to verify the contents of the software container. If the in-memory verification passes, the hypervisor may use VIS to protect the pages for the software container in memory. In addition to protecting the memory pages, the hypervisor may also initialize or zero out the data page that may be used subsequently by the software container.

At an operation 406, the hypervisor may fetch the nonce from the software container's data page, e.g., as discussed with reference to FIG. 3 above. For example, the hypervisor may use direct physical memory access to read the negotiated shared secret from the protected memory page of the container in one embodiment. At an operation 408, the hypervisor may obtain a TPM Quote using the DH nonce for the TPM PCRs. For example, the hypervisor may use the TPM directly to issue a TPM Quote based on the container provided shared secret key. At an operation 410, the hypervisor may store the result of the TPM Quote and the TPM key certificate into the software container's data page. For example, the resultant encrypted data may be provided back to the software container in memory protected by VIS. The hypervisor may also return to the container a certificate for the TPM key used (e.g., a certificate authority-signed AIK public key).

Figure 5:
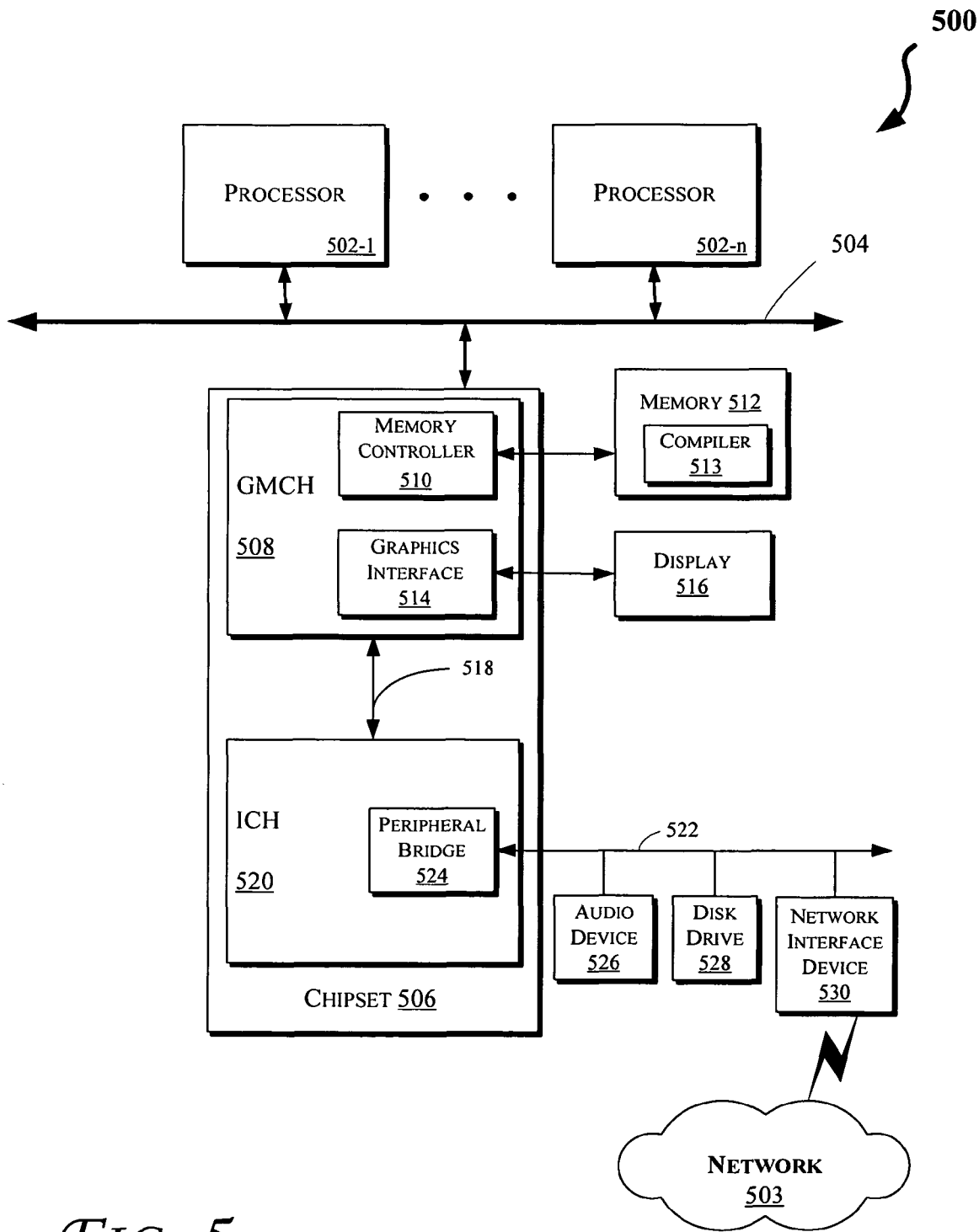
FIGS. 5 and 6 illustrate block diagrams of embodiments of computing systems, which may be utilized to implement some embodiments discussed herein.

FIG. 5 illustrates a block diagram of an embodiment of a computing system 500. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4, e.g., by processing instructions, executing subroutines, etc. in accordance with the operations discussed herein. Also, various storage devices discussed herein (e.g., with reference to FIGS. 5 and/or 6) may be used to store data, operation results, etc. In one embodiment, data received over the network 503 (e.g., via network interface devices 530 and/or 630 and/or between the software container and remote server of FIGS. 1-4) may be stored in caches (e.g., L1 caches in an embodiment) present in processors 502 (and/or 602 of FIG. 6). These processor(s) may then apply the operations discussed herein to verify the security of the software container in accordance with various embodiments of the invention.

More particularly, the computing system 500 may include one or more central processing unit(s) (CPUs) 502 or processors that communicate via an interconnection network (or bus) 504. Hence, various operations discussed herein may be performed by a CPU in some embodiments. Moreover, the processors 502 may include a general purpose processor, a network processor (that processes data communicated over a computer network 503 (e.g., between the software container 110 and the remote server 112 of FIGS. 1-4), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Moreover, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the CPU 502, or any other device included in the computing system 500. In an embodiment, the memory 512 may be the same or similar to the main memory 412 of FIG. 4. Furthermore, memory 512 may store one or more of the programs or algorithms discussed herein such as a compiler 513, instructions corresponding to executables, mappings, etc. Same or at least a portion of this data (including instructions) may be stored in disk drive 528 and/or one or more caches within processors 502. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display 516. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530, which may be in communication with the computer network 503. For example, a remote server (e.g., the remote server 112 discussed with reference to FIGS. 1-4) may be coupled to a software container (e.g., the software container 110 of FIGS. 1-4) via the computer network 503. In an embodiment, the device 530 may be a NIC capable of wireless communication. Other devices may communicate via the bus 522. Also, various components (such as the network interface device 530) may communicate with the GMCH 508 in some embodiments of the invention. In addition, the processor 502, the GMCH 508, and/or the graphics interface 514 may be combined to form a single chip.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
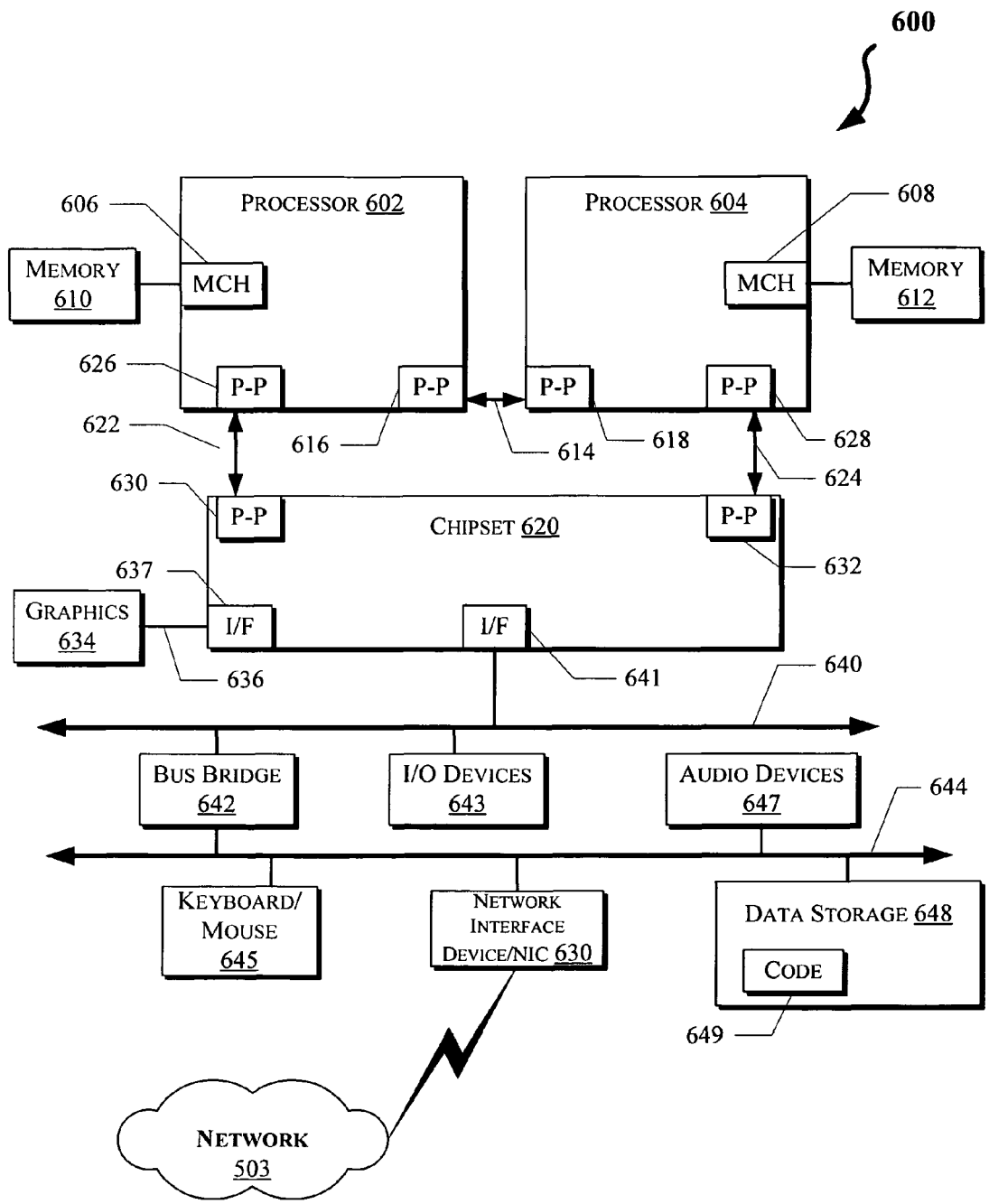

More specifically, FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 (which may be the same or similar to the GMCH 508 of FIG. 5 in some embodiments) to couple with memories 610 and 612. The memories 610 and/or 612 may store various data such as those discussed with reference to the memory 512 of FIG. 5.

The processors 602 and 604 may be any suitable processor such as those discussed with reference to the processors 602 of FIG. 6. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-5 (e.g., discussed with reference to software containers). Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 630 discussed with reference to FIG. 6 (such as modems, network interface cards (NICs), or the like that may be coupled to the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software (including, for example, micro-code that controls the operations of a processor such as the processors discussed with reference to FIGS. 5-6), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
generating a secret key based on one or more exchanges between a server and a software container of a computing platform;
generating a measurement value corresponding to a hypervisor stored on the computing platform, wherein the hypervisor comprises a virtual machine monitor to verify contents of the software container and protect one or more memory pages for the software container in response to a message transmitted from the software container to the hypervisor;
determining whether the software container is associated with the computing platform based on the secret key and the measurement value; and
determining whether the computing platform is controlling access to a portion of a memory corresponding to the software container based on the measurement value.

2. The method of claim 1, further comprising:
storing the measurement value in a platform configuration register;
launching an operating system in a hardware virtual machine; and
instrumenting the software container to comprise an integrity manifest.

3. The method of claim 2, further comprising:
verifying at least some content of the software container based on a registration message sent to the hypervisor, the registration message comprising the integrity manifest;
controlling access to the portion of memory; and
initializing a data page corresponding to the software container, wherein the portion of memory comprises the data page.

4. The method of claim 1, further comprising storing the generated secret key a pre-determined location in the data page, wherein the secret key is shared between the server and the software container.

5. The method of claim 4, further comprising signing the measurement value and the secret key with a private key to generate an encrypted data.

6. The method of claim 5, further comprising:
storing the encrypted data to the data page to provide the software container access to the encrypted data; and
transferring a certificate for the private key to the software container,
wherein the certificate is a certificate authority (CA) signed public key corresponding to the private key.

7. The method of claim 6, further comprising:
transferring the encrypted data to the server;
verifying whether the certificate is valid based on a CA public key; and
verifying whether the encrypted data is valid based on the CA signed public key.

8. The method of claim 1, further comprising decompressing or decrypting a portion of the software container into the portion of memory.

9. The method of claim 1, wherein generating the secret key based on the one or more exchanges is performed in accordance with Diffie-Hellman.

10. The method of claim 1, wherein the server is a remote server coupled to the computing platform via a network.

11. The method of claim 1, further comprising controlling access to the software container in accordance with a license granted by a second server, wherein the second server is a local license server.

12. A non-transitory computer-readable medium comprising one or more instructions that when executed on a processor configure the processor to perform one or more operations to:
generate a secret key based on one or more exchanges between a server and a software container of a computing platform;
generate a measurement value corresponding to a hypervisor stored on the computing platform, wherein the hypervisor comprises a virtual machine monitor to verify contents of the software container and protect one or more memory pages for the software container in response to a message transmitted from the software container to the hypervisor;
determine whether the software container is associated with the computing platform based on the secret key and the measurement value; and
determine whether the computing platform is controlling access to a portion of a memory corresponding to the software container based on the measurement value.

13. The computer-readable medium of claim 12, further comprising one or more instructions that when executed on a processor configure the processor to perform one or more operations to:
verify at least some content of the software container based on a registration message sent to the hypervisor, the registration message comprising an integrity manifest corresponding to the software container;
control access to the portion of memory; and
initialize a data page corresponding to the software container, wherein the portion of memory comprises the data page.

14. The computer-readable medium of claim 13, further comprising one or more instructions that when executed on a processor configure the processor to perform one or more operations to:
sign the measurement value and the secret key with a private key to generate an encrypted data;
store the encrypted data to the data page to provide the software container access to the encrypted data; and
transfer a certificate for the private key to the software container, wherein the certificate is a certificate authority (CA) signed public key corresponding to the private key.

15. The computer-readable medium of claim 14, further comprising one or more instructions that when executed on a processor configure the processor to perform one or more operations to:
transfer the encrypted data to the server;
verify whether the certificate is valid based on a CA public key; and
verify whether the encrypted data is valid based on the CA signed public key.

16. A system comprising:
a memory to store one or more instructions corresponding to a software container; and
a processor to execute the one or more instructions to control access to a protected portion of the memory corresponding to the software container based on:
a secret key, based on one or more exchanges between a server and the software container; and
a measurement value, based on information from a hypervisor, wherein the hypervisor is to comprise a virtual machine monitor to verify contents of the software container and protect one or more memory pages for the software container in response to a message transmitted from the software container to the hypervisor.

17. The system of claim 16, wherein the server and the software container are to exchange one or more exchanges in accordance with Diffie-Hellman to generate the secret key.

18. The system of claim 16, further comprising a network to couple the server and the processor.

19. The system of claim 16, further comprising a local license server coupled between the server and the processor, wherein the local license server is to generate the secret key.

20. The system of claim 16, wherein the memory is to store data corresponding to the hypervisor.

* * * * *